US012312427B2

(12) United States Patent
Imamura et al.

(10) Patent No.: US 12,312,427 B2
(45) Date of Patent: May 27, 2025

(54) MEMBER TO BE COMPRESSED FOR ELECTROCHEMICAL DEVICES

(71) Applicant: DAIKIN INDUSTRIES, LTD., Osaka (JP)

(72) Inventors: Hitoshi Imamura, Osaka (JP); Takahisa Aoyama, Osaka (JP); Hayato Tsuda, Osaka (JP); Tadaharu Isaka, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 761 days.

(21) Appl. No.: 17/599,086

(22) PCT Filed: Apr. 3, 2020

(86) PCT No.: PCT/JP2020/015319
§ 371 (c)(1),
(2) Date: Sep. 28, 2021

(87) PCT Pub. No.: WO2020/204163
PCT Pub. Date: Oct. 8, 2020

(65) Prior Publication Data
US 2022/0195088 A1 Jun. 23, 2022

(30) Foreign Application Priority Data

Apr. 5, 2019 (JP) ................. 2019-072588

(51) Int. Cl.
C08F 214/26 (2006.01)
H01M 50/193 (2021.01)
H01M 50/42 (2021.01)
H01M 50/426 (2021.01)

(52) U.S. Cl.
CPC ....... C08F 214/262 (2013.01); H01M 50/193 (2021.01); H01M 50/426 (2021.01); C08F 2800/20 (2013.01)

(58) Field of Classification Search
CPC ................................................ C08F 214/262
See application file for complete search history.

(56) References Cited

U.S. PATENT DOCUMENTS

| | | | | |
|---|---|---|---|---|
| 4,743,658 A * | 5/1988 | Imbalzano | .......... | C08F 214/262 525/356 |
| 4,952,630 A * | 8/1990 | Morgan | .................. | C08L 51/06 525/196 |
| 5,760,151 A * | 6/1998 | Aten | .................... | C08F 214/262 526/247 |
| 6,559,238 B1 * | 5/2003 | Brothers | ............... | C08F 214/18 525/326.3 |
| 6,774,196 B1 | 8/2004 | Taira et al. | | |
| 6,846,904 B1 * | 1/2005 | Imanishi | .................... | C08F 8/50 524/544 |
| 7,030,191 B2 * | 4/2006 | Namura | .................. | C08L 27/18 525/200 |
| 7,169,868 B2 * | 1/2007 | Aoyama | .................... | C08F 8/22 152/209.1 |
| 7,347,258 B2 * | 3/2008 | McKeen | ................. | E21B 17/00 166/242.1 |
| 7,531,113 B2 * | 5/2009 | Frances | .................... | C08L 27/12 524/444 |
| 7,601,401 B2 * | 10/2009 | Hennessey | ............. | B05D 5/083 427/470 |
| 8,039,073 B2 * | 10/2011 | Lahijani | ............. | F16L 58/1036 428/34.7 |
| 8,053,527 B2 * | 11/2011 | Burch | .................... | C08F 259/08 525/199 |
| 8,178,592 B2 * | 5/2012 | Burch | ........................ | C08J 9/122 525/355 |
| 8,192,677 B2 * | 6/2012 | Aten | ........................ | B29C 48/12 264/540 |
| 8,211,497 B2 * | 7/2012 | McKeen | ............. | F16L 58/1009 427/230 |
| 8,971,707 B2 * | 3/2015 | Colaianna | ............ | C09D 127/18 398/58 |
| 9,803,036 B2 * | 10/2017 | Pieri | ........................ | C08F 14/18 |
| 9,834,631 B2 * | 12/2017 | Sekiguchi | ............ | C08F 214/265 |
| 10,294,339 B2 * | 5/2019 | Imamura | .................... | C08J 3/28 |
| 10,731,015 B2 * | 8/2020 | Sawaki | ........................ | C08J 3/28 |
| 11,021,582 B2 * | 6/2021 | Imamura | .................... | C08J 3/28 |
| 11,072,672 B2 * | 7/2021 | Imamura | ............. | B29C 35/0805 |
| 11,427,662 B2 * | 8/2022 | Colaianna | .............. | C08K 3/013 |
| 11,826,975 B2 * | 11/2023 | Imamura | ................. | B29C 59/16 |
| 2005/0090617 A1 * | 4/2005 | Namura | .................. | C08L 27/18 525/200 |
| 2005/0173012 A1 * | 8/2005 | McKeen | ................. | F16L 9/121 138/146 |
| 2005/0267246 A1 * | 12/2005 | McKeen | ..................... | C08J 5/18 524/450 |
| 2007/0095473 A1 * | 5/2007 | Farnsworth | ......... | F16L 58/1036 156/294 |
| 2009/0030154 A1 * | 1/2009 | Isogai | ....................... | C08F 8/22 525/326.4 |

(Continued)

FOREIGN PATENT DOCUMENTS

CA   2628919 A1 *  7/2007  ............. B29C 48/09
CA   2736964 A1 *  5/2010  ............. C08F 14/18

(Continued)

OTHER PUBLICATIONS

International Preliminary Report on Patentability dated Sep. 28, 2021 with a Translation of the Written Opinion of the International Searching Authority in Application No. PCT/JP2020/015319.
Extended European Search Report issued Nov. 25, 2022 in corresponding European Application No. 20785314.4.
International Search Report for PCT/JP2020/015319 dated, Jun. 23, 2020 (PCT/ISA/210).

Primary Examiner — Rip A Lee
(74) Attorney, Agent, or Firm — Sughrue Mion, PLLC

(57) ABSTRACT

A member to be compressed for an electrochemical device, including a copolymer containing a tetrafluoroethylene unit and a fluoroalkyl vinyl ether unit, the copolymer having a content of the fluoroalkyl vinyl ether unit based on all the monomer units of the copolymer of 4.3% by mass or more and less than 5.5% by mass, and having a melt flow rate of 10 to 23 g/10 min.

7 Claims, No Drawings

(56) References Cited

U.S. PATENT DOCUMENTS

| | | | |
|---|---|---|---|
| 2009/0038821 A1* | 2/2009 | Sato | C08F 214/262 521/149 |
| 2016/0319089 A1 | 11/2016 | Imamura et al. | |

FOREIGN PATENT DOCUMENTS

| | | | |
|---|---|---|---|
| CN | 105849163 A | 8/2016 | |
| EP | 0312077 A1 * | 4/1989 | ............... H01B 1/24 |
| EP | 0866107 A1 * | 9/1998 | |
| EP | 1 462 458 A1 | 9/2004 | |
| JP | 11-016548 A | 1/1999 | |
| JP | 2001-071376 A | 3/2001 | |
| JP | 2001-151825 A | 6/2001 | |
| JP | 2004161921 A * | 6/2004 | |
| JP | 2010-056079 A | 3/2010 | |
| JP | 2010-282848 A | 12/2010 | |
| JP | 4599640 B2 * | 12/2010 | .......... C08F 214/262 |
| JP | 2014-035997 A | 2/2014 | |
| JP | 2015-178899 A | 10/2015 | |
| KR | 10-2016-0119202 A | 10/2016 | |
| WO | WO-2005059430 A1 * | 6/2005 | ........... C09D 127/12 |
| WO | WO-2013115374 A1 * | 8/2013 | ............ C08F 214/26 |
| WO | WO-2014013989 A1 * | 1/2014 | ............ B29C 65/561 |
| WO | 2015/104975 A1 | 7/2015 | |
| WO | 2015/129866 A1 | 9/2015 | |
| WO | WO-2015148285 A1 * | 10/2015 | ............. B32B 27/08 |
| WO | 2018/216284 A1 | 11/2018 | |

\* cited by examiner

MEMBER TO BE COMPRESSED FOR ELECTROCHEMICAL DEVICES

CROSS REFERENCE TO RELATED APPLICATIONS

This application is a National Stage of International Application No. PCT/JP2020/015319 filed Apr. 3, 2020, claiming priority based on Japanese Patent Application No. 2019-072588 filed Apr. 5, 2019.

TECHNICAL FIELD

The present disclosure relates to a member to be compressed for an electrochemical device.

BACKGROUND ART

A sealing member is used in, for example, a sealed battery. Patent Document 1 discloses sealing a terminal extraction hole provided on a battery case that houses an electrode body and an electrolyte with a cyclic seal member having a through-hole.

RELATED ART

Patent Documents

Patent Document 1: Japanese Patent Laid-Open No. 2010-282848

SUMMARY OF THE INVENTION

Problem to be Solved by the Invention

An object of the present disclosure is to provide a member to be compressed for an electrochemical device which may easily be produced by an injection molding method and is excellent in surface smoothness, crack resistance, and resistance to compression set.

Means for Solving the Problem

According to the present disclosure, there is provided a member to be compressed for an electrochemical device, containing at least one copolymer selected from the group consisting of (1) a copolymer containing a tetrafluoroethylene unit and a fluoroalkyl vinyl ether unit, the copolymer having a content of the fluoroalkyl vinyl ether unit based on all the monomer units of the copolymer of 4.3% by mass or more and less than 5.5% by mass, and having a melt flow rate of 10 to 23 g/10 min, and (2) a copolymer containing a tetrafluoroethylene unit and a fluoroalkyl vinyl ether unit, the copolymer having a content of the fluoroalkyl vinyl ether unit based on all the monomer units of the copolymer of 5.5% by mass or more and 8.0% by mass or less, and having a melt flow rate of 23 to 68 g/10 min.

In the member to be compressed for an electrochemical device of the present disclosure, the fluoroalkyl viny ether unit is preferably at least one selected from the group consisting of perfluoro(ethyl vinyl ether) unit and perfluoro (propyl vinyl ether) unit.

In the member to be compressed for an electrochemical device of the present disclosure, the copolymer preferably has a melting point of 305° C. or lower.

In the member to be compressed for an electrochemical device of the present disclosure, the copolymer preferably has a compression set of 85% or less, the compression set being measured after the copolymer in a state of being compression-deformed at a compression deformation rate of 50% is retained at 40° C. for 1,000 hours.

The member to be compressed for an electrochemical device of the present disclosure is preferably used in a state of being compression-deformed at a compression deformation rate of 30% or more.

The member to be compressed for an electrochemical device of the present disclosure is preferably used in an environment where the maximum temperature reaches 40° C. or higher.

The member to be compressed for an electrochemical device of the present disclosure is preferably an injection-molded article.

The member to be compressed for an electrochemical device of the present disclosure is preferably a member to be compressed for a battery.

The member to be compressed for an electrochemical device of the present disclosure is preferably a sealing member or an insulating member.

Effects of Invention

According to the present disclosure, a member to be compressed for an electrochemical device which may easily be produced by an injection molding method and is excellent in surface smoothness, crack resistance, and resistance to compression set may be provided.

DESCRIPTION OF EMBODIMENTS

Hereinafter, specific embodiments of the present disclosure will be described in detail, but the present disclosure is not limited to the following embodiments.

A member to be compressed for an electrochemical device of the present disclosure is a member that is used by being compression-deformed. The member to be compressed for an electrochemical device of the present disclosure contains a copolymer containing a tetrafluoroethylene (TFE) unit and a fluoroalkyl viny ether (FAVE) unit. The present inventors have found that when a copolymer in which the content of the FAVE unit and the melt flow rate (MFR) each are adjusted in particular ranges is used as a molding material for a member to be compressed for an electrochemical device, the member to be compressed for an electrochemical device may easily be produced by an injection molding method (injection-moldability), the resultant member to be compressed for an electrochemical device has a small surface roughness (surface smoothness), a crack is unlikely to occur even when the member to be compressed for an electrochemical device is compression-deformed at a high compression deformation rate (crack resistance), and, further, the member to be compressed for an electrochemical device shows a low compression set (resistance to compression set) even after using the member to be compressed for an electrochemical device at a high temperature in a state where the member to be compressed for an electrochemical device is compression-deformed at a high compression deformation rate. That is, the member to be compressed for an electrochemical device of the present disclosure is the invention completed by finding the most suitable materials for satisfying these requirements all together.

The member to be compressed for an electrochemical device of the present disclosure contains at least one copolymer selected from the group consisting of (1) a copolymer containing a tetrafluoroethylene unit and a fluoroalkyl vinyl ether unit, the copolymer having a content of the fluoroalkyl vinyl ether unit based on all the monomer units of the copolymer of 4.3% by mass or more and less than 5.5% by mass, and having a melt flow rate of 10 to 23 g/10 min, and (2) a copolymer containing a tetrafluoroethylene unit and a fluoroalkyl vinyl ether unit, the copolymer having a content of the fluoroalkyl vinyl ether unit based on all the monomer units of the copolymer of 5.5% by mass or more and 8.0% by mass or less, and having a melt flow rate of 23 to 68 g/10 min.

The content of the fluoroalkyl viny ether (FAVE) unit of the copolymer (1) is 4.3% by mass or more and less than 5.5% by mass, and for the reason that the member to be compressed for an electrochemical device, which is still more excellent in crack resistance and resistance to compression set, is obtained, the content of the fluoroalkyl viny ether (FAVE) unit of the copolymer (1) is preferably 4.5% by mass or more, and is preferably 5.0% by mass or less, and still more preferably 4.7% by mass or less.

The content of the tetrafluoroethylene (TFE) unit of the copolymer (1) is preferably more than 94.5% by mass, and more preferably 95.0% by mass or more, and is preferably 95.7% by mass or less, and more preferably 95.5% by mass or less based on all the monomer units of the copolymer for the reason that the member to be compressed for an electrochemical device, which is still more excellent in crack resistance and resistance to compression set, is obtained.

The MFR of the copolymer (1) is 10 to 23 g/10 min, and for the reason that the member to be compressed for an electrochemical device, which may more easily be produced by an injection molding method and is still more excellent in surface smoothness, is obtained, the MFR of the copolymer (1) is preferably 12 g/10 min or more, and is preferably 15 g/10 min or less.

Since the copolymer (1) has a MFR within the range, the copolymer (1) may easily be molded by an injection molding method. For example, when a large number of molded articles of small size are produced at a time by an injection molding method, a mold having an extremely complicated shape needs to be used. For the reason that even when a mold having a complicated shape is used, the mold is sufficiently filled with the copolymer (1), a plurality of small-sized members to be compressed for an electrochemical device may be produced at a time by injection-molding the copolymer (1). Accordingly, the member to be compressed for an electrochemical device of the present disclosure containing the copolymer (1) may be produced with high productivity by an injection molding method. In a conventional method using a copolymer to which injection mold is difficult to apply, a member to be compressed for an electrochemical device has been produced by preparing a large block of the copolymer, thereafter, cutting the block, and punching and compressing a resultant sheet. Cutting is not only inferior in productivity but also leaves a cutting trace on the surface of the member to be compressed for an electrochemical device. For the reason that the member to be compressed for an electrochemical device having a desired shape may be produced by an injection molding method and a cutting trace is not left on the surface of the resultant member to be compressed for an electrochemical device, the member to be compressed for an electrochemical device of the present disclosure is also excellent in surface smoothness. The member to be compressed for an electrochemical device, which is excellent in surface smoothness, may adhere closely to another member without a gap, and therefore is excellent in sealing properties when used as a sealing member, and is excellent in insulating properties when used as an insulating member.

Since the content of the FAVE unit and the MFR of the copolymer (1) are within the ranges, the member to be compressed for an electrochemical device containing the copolymer (1) may easily be produced by an injection molding method, and is not only excellent in surface smoothness but also excellent in crack resistance and resistance to compression set. When the content of the FAVE unit is within the range but the MFR is out of the range, production by an injection molding method is difficult, or the member to be compressed for an electrochemical device is inferior in crack resistance or resistance to compression set. When the MFR is within the range but the content of the FAVE unit is out of the range, the member to be compressed for an electrochemical device is inferior in crack resistance or resistance to compression set.

The content of the FAVE unit of the copolymer (2) is 5.5% by mass or more and 8.0% by mass or less, and, for the reason that the member to be compressed for an electrochemical device which is still more excellent in crack resistance and resistance to compression set is obtained, the content of the FAVE unit of the copolymer (2) is preferably 6.0% by mass or more, and more preferably 6.5% by mass or more, and is preferably 7.5% by mass or less, and more preferably 7.0% by mass or less.

The content of the TFE unit of the copolymer (2) is preferably 92.0% by mass or more, more preferably 92.5% by mass or more, and still more preferably 93.0% by mass or more, and is preferably 94.5% by mass or less, more preferably 94.0% by mass or less, and still more preferably 93.5% by mass or less based on all the monomer units of the copolymer for the reason that the member to be compressed for an electrochemical device, in which a crack is still more unlikely to occur and which is still more excellent in crack resistance and resistance to compression set, is obtained.

The MFR of the copolymer (2) is 23 to 68 g/10 min, and for the reason that the member to be compressed for an electrochemical device which may more easily be produced by an injection molding method and is still more excellent in surface smoothness is obtained, the MFR of the copolymer (2) is preferably 25 g/10 min or more, and is preferably 62 g/10 min or less, and more preferably 40 g/10 min or less.

Since the copolymer (2) has a MFR within the range, the copolymer (2) may easily be molded by an injection molding method. For example, when a plurality of molded articles of a small size is produced at a time by an injection molding method, a mold having an extremely complicated shape needs to be used. For the reason that even when a mold having a complicated shape is used, the mold is sufficiently filled with the copolymer (2), a plurality of small-sized members to be compressed for an electrochemical device may be produced at a time by injection-molding the copolymer (2). Accordingly, the member to be compressed for an electrochemical device of the present disclosure containing the copolymer (2) may be produced with high productivity by an injection molding method. In a conventional method using a copolymer to which injection mold is difficult to apply, a member to be compressed for an electrochemical device has been produced by preparing a large block of the copolymer, thereafter, cutting the block, and punching and compressing a resultant sheet. Cutting is not only inferior in productivity but also leaves a cutting trace on the surface of the member to be compressed for an electrochemical device. For the reason that the member to be compressed for an electrochemical device having a desired shape may be produced by an injection molding method and a cutting trace is not left on the surface of the resultant member to be compressed for an electrochemical device, the member to be compressed for an electrochemical device of the present disclosure is also excellent in surface smoothness. The member to be compressed for an electrochemical device which is excellent in surface smoothness may adhere closely to another member without a gap, and therefore is excellent in sealing properties when used as a sealing member, and is excellent in insulating properties when used as an insulating member.

Since the contents of the FAVE unit and the MFR of the copolymer (2) are within the ranges, the member to be compressed for an electrochemical device containing the copolymer (2) may easily be produced by an injection molding method and is not only excellent in surface smoothness but also excellent in crack resistance and resistance to compression set. When the content of the FAVE unit is within the range but the MFR is out of the range, production by an injection molding method is difficult, or the member to be compressed for an electrochemical device is inferior in crack resistance or resistance to compression set. When the MFR is within the range but the content of the FAVE unit is out of the range, the member to be compressed for an electrochemical device is inferior in crack resistance or resistance to compression set.

In the present disclosure, the content of each monomer unit in the copolymer is measured by a $^{19}$F-NMR method.

In the present disclosure, the melt flow rate is a value obtained in accordance with ASTM D1238 using a melt indexer (manufactured by YASUDA SEIKI SEISAKUSHO, LTD.) as the mass of a polymer that flows out per 10 minutes (g/10 min) from a nozzle having an inner diameter of 2.1 mm and a length of 8 mm under a load of 5 kg at 372° C.

In some embodiments, the member to be compressed for an electrochemical device of the present disclosure contains only the copolymer (1), contains only the copolymer (2), or contains both of the copolymer (1) and the copolymer (2) as the copolymer, but preferably contains only the copolymer (1) or contains only the copolymer (2). The member to be compressed for an electrochemical device containing only the copolymer (1) satisfies the content of the FAVE unit and MFR of the copolymer (1), but may contain two or more copolymers (1) each having a different content of the FAVE unit and a different MFR. The member to be compressed for an electrochemical device containing only the copolymer (2) satisfies the content of the FAVE unit and MFR of the copolymer (2), but may contain two or more copolymers (2) each having a different content of the FAVE unit and a different MFR.

The copolymers (1) and (2) are copolymers containing the TFE unit and the FAVE unit (hereinafter, referred to as TFE/FAVE copolymer (or PFA)). The copolymers (1) and (2) are melt-fabricable fluororesins. Being melt-fabricable means that a polymer may be fabricated by melting the polymer using a conventional processing device, such as an extruder and an injection molding machine. As just described, the TFE/FAVE copolymer is easily fabricable, and therefore production of the member to be compressed for an electrochemical device of the present disclosure, containing a TFE/FAVE copolymer, is easy. The member to be compressed for an electrochemical device of the present disclosure contains a TFE/FAVE copolymer, and therefore is also excellent in heat resistance, heat shock resistance, stress cracking resistance, resistance to an electrolytic solution, low moisture permeability, and the like.

Examples of FAVE that constitutes the FAVE unit include at least one selected from the group consisting of a monomer represented by formula (1):

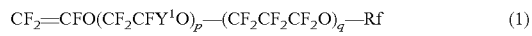

$$CF_2=CFO(CF_2CFY^1O)_p-(CF_2CF_2CF_2O)_q-Rf \qquad (1)$$

wherein $Y^1$ represents F or $CF_3$, Rf represents a perfluoroalkyl group having 1 to 5 carbon atoms, p represents an integer of 0 to 5, and q represents an integer of 0 to 5, and a monomer represented by formula (2):

$$CFX=CXOCF_2OR^1 \qquad (2)$$

wherein Xs are the same or different, and each represent H, F, or $CF_3$, $R^1$ represents a linear or branched fluoroalkyl group having 1 to 6 carbon atoms optionally containing one or two atoms of at least one atom selected from the group consisting of H, Cl, Br, and I, or represents a cyclic fluoroalkyl group having 5 or 6 carbon atoms optionally containing one or two atoms of at least one atom selected from the group consisting of H, Cl, Br, and I.

Among others, for the reason that the member to be compressed for an electrochemical device which may more easily be produced by an injection molding method and is more excellent in surface smoothness, crack resistance, and resistance to compression set is obtained, the FAVE is preferably a monomer represented by formula (1), more preferably at least one selected from the group consisting of perfluoro(methyl vinyl ether), perfluoro(ethyl vinyl ether) (PEVE), and perfluoro(propyl vinyl ether) (PPVE), still more preferably at least one selected from the group consisting of PEVE and PPVE, and particularly preferably PPVE.

The copolymers (1) and (2) may also contain a monomer unit derived from a monomer copolymerizable with TFE and FAVE. In this case, the content of the monomer copolymerizable with TFE and FAVE is preferably 0 to 10% by mass, and more preferably 0.1 to 5% by mass based on all the monomer units of the copolymer.

Examples of the monomer copolymerizable with TFE and FAVE include HFP, a vinyl monomer represented by $CZ^1Z^2=CZ^3(CF_2)_nZ^4$, wherein $Z^1$, $Z^2$, and $Z^3$ are the same or different, and each represent H or F, $Z^4$ represents H, F, or Cl, and n represents an integer of 2 to 10, and an alkyl perfluorovinyl ether derivative represented by $CF_2=CF-OCH_2-Rf^1$, wherein $Rf^1$ represents a perfluoroalkyl group having 1 to 5 carbon atoms. Among others, HFP is preferable.

Each of the copolymers (1) and (2) is preferably at least one selected from the group consisting of a copolymer consisting only of a TFE unit and a FAVE unit, and the TFE/HFP/FAVE copolymer, and is more preferably a copolymer consisting of a TFE unit and a FAVE unit.

The melting points of the copolymers (1) and (2) are preferably 280 to 322° C., and more preferably 290° C. or higher, and are more preferably 315° C. or lower, and still more preferably 305° C. or lower. Further, for the reason that the member to be compressed for an electrochemical device which may more easily be produced by an injection molding method and is more excellent in surface smoothness, crack resistance, and resistance to compression set is obtained, the melting points of the copolymers (1) and (2) are further still more preferably lower than 305° C., particularly preferably 302° C. or lower, and most preferably 300° C. or lower. The melting point may be measured using a differential scanning calorimeter [DSC].

The glass transition temperatures (Tg) of the copolymers (1) and (2) are preferably 70 to 110° C., and more preferably 80° C. or higher, and are more preferably 100° C. or lower.

The glass transition temperature may be measured by dynamic viscoelasticity measurement.

The copolymers (1) and (2) may be produced by a known method, such as, for example, mixing monomers to be constituent units of the copolymer, and an additive, such as a polymerization initiator, appropriately and performing emulsion polymerization or suspension polymerization.

In some embodiments, if necessary, the member to be compressed for an electrochemical device of the present disclosure contains an additional component. Examples of the additional component include a filler, a plasticizer, a pigment, a colorant, an antioxidizing agent, an ultraviolet ray absorber, a flame retarder, an antiaging agent, an antistatic agent, and an antibacterial agent.

Among others, the additional component is preferably a filler. Examples of the filler include silica, kaolin, clay, organized clay, talc, mica, alumina, calcium carbonate, calcium terephthalate, titanium oxide, calcium phosphate, calcium fluoride, lithium fluoride, crosslinked polystyrene, potassium titanate, carbon, boron nitride, a carbon nanotube, and glass fiber. Among others, boron nitride is preferable.

As mentioned above, the member to be compressed for an electrochemical device of the present disclosure may further contain various additives other than the copolymers (1) and (2). However, from the viewpoint of exhibiting excellent properties of the copolymers (1) and (2) more sufficiently, the content of the additives is preferably smaller, and most preferably, the member to be compressed for an electrochemical device of the present disclosure does not contain an additive. Specifically, the amount of the additives is preferably 30% by mass or less, more preferably 10% by mass or less, and most preferably 0% by mass based on the member to be compressed for an electrochemical device of the present disclosure, that is, the member to be compressed for an electrochemical device of the present disclosure most preferably does not contain an additive. In some embodiments, the member to be compressed for an electrochemical device of the present disclosure consists of at least one copolymer selected from the group consisting of the copolymers (1) and (2).

The member to be compressed for an electrochemical device of the present disclosure may be produced by molding at least one copolymer selected from the group consisting of the copolymers (1) and (2), or a composition containing at least one copolymer selected from the group consisting of the copolymers (1) and (2), and an additive into a desired shape or size. Examples of the method for producing the composition include a method of mixing the copolymer and the additive in a dry system, and a method of mixing the copolymer and the additive with a mixer in advance, and subsequently melt-kneading a resultant mixture with a kneader, a melt extruder, or the like.

The method for molding the copolymer or the composition is not limited, and examples of the method include an injection molding method, an extrusion method, a compression molding method, and a blow molding method. Among others, the molding method is preferably a compression molding method or an injection molding method, and, for the reason that the member to be compressed for an electrochemical device may be produced with high productivity, more preferably an injection molding method. That is, the member to be compressed for an electrochemical device of the present disclosure is preferably a compression-molded article or an injection-molded article, and, for the reason that the member to be compressed for an electrochemical device of the present disclosure may be produced with high productivity, more preferably an injection-molded article.

A crack is unlikely to occur even when the member to be compressed for an electrochemical device of the present disclosure is deformed at a high compression deformation rate. For example, in a non-aqueous electrolytic solution secondary battery, leakage of the contents, such as an electrolytic solution, is prevented, and invasion of air and moisture from outside is prevented by disposing the member (sealing member) to be compressed for an electrochemical device in a state of being compressed between the case that houses an electrode body and the lid. When the member to be compressed for an electrochemical device is compressed at a higher compression deformation rate, the rebound resilience of the member to be compressed for an electrochemical device is larger, and the sealing properties are improved. In recent years, further extension of life has been required in secondary batteries, and retaining a certain level of repulsive stress is required in a member to be compressed for an electrochemical device even after the use for a long period of time. For example, in a member to be compressed for an electrochemical device, which is used for a secondary battery or the like to be mounted on a movable body, such as an automobile, performance of preventing leakage of an electrolytic solution over a long period of time is required.

However, when a member to be compressed for an electrochemical device is used in a state of being deformed at a high compression deformation rate for a long period of time, the repulsive stress is attenuated by stress relaxation, and the sealing properties are deteriorated. Accordingly, there is a tendency that the compression deformation rate for a member to be compressed for an electrochemical device is higher than that in conventional cases in order to retain a certain level of repulsive stress after the use for a long period of time.

However, a crack may occur in a conventional member to be compressed for an electrochemical device when deformed at a high compression deformation rate. Even though a crack does not occur in a member to be compressed for an electrochemical device when deformed at a high compression deformation rate, the repulsive stress cannot be retained sufficiently, so that the sealing properties may be deteriorated. Deterioration in the sealing properties appears particularly remarkably when a member to be compressed for an electrochemical device is continuously used at a high temperature. A crack is unlikely to occur in the member to be compressed for an electrochemical device of the present disclosure when deformed at a high compression deformation rate, and further, the member to be compressed for an electrochemical device of the present disclosure exhibits a low compression set even after the member to be compressed for an electrochemical device of the present disclosure is used at a high temperature in a state of being deformed at a high compression deformation rate.

The copolymers (1) and (2) preferably have compression sets of 85% or less, the compression sets being measured after the copolymers (1) and (2) in a state of being compression-deformed at a compression deformation rate of 50% are retained at 40° C. for 1,000 hours. When the copolymers (1) and (2) have small compression deformation rates after high-temperature compression, the member to be compressed for an electrochemical device in which a crack is still more unlikely to occur and the compression set after high-temperature compression is still lower may thereby be obtained.

Since the member to be compressed for an electrochemical device of the present disclosure has the above-mentioned constitution, a crack does not occur, and the low compression set may be retained even when the member to be compressed for an electrochemical device of the present disclosure is used in a state of being compression-deformed at a compression deformation rate of 30% or more. By using the member to be compressed for an electrochemical device of the present disclosure in a state of being compression-deformed at a compression deformation rate of 30% or more, a certain level of rebound resilience may be retained for a long period of time, and the sealing properties and the insulating properties may be retained for a long period of time. The compression deformation rate when the member to be compressed for an electrochemical device of the present disclosure is used is preferably 35% or more, and more preferably 40% or more.

The compression deformation rate is a compression deformation rate at a part where the compression deformation rate is the largest when a member to be compressed for an electrochemical device is used in a state of being compressed. For example, when a flat member to be compressed for an electrochemical device is used in a state of being compressed in the thickness direction, the compression deformation rate is a compression deformation rate in the thickness direction. In addition, for example, when only some parts of the member to be compressed for an electrochemical device are used in a state of being compressed, the compression deformation rate is a compression deformation rate at a part where the compression deformation rate is the largest of the compression deformation rates at the compressed parts.

In some embodiments, the size and shape of the member to be compressed for an electrochemical device of the present disclosure are appropriately set according to the application and are not limited. In some embodiments, the shape of the member to be compressed for an electrochemical device of the present disclosure is, for example, cyclic. In some embodiments, the member to be compressed for an electrochemical device of the present disclosure has a shape of a circle, an ellipse, a square with rounded corners, or the like in plain view, and has a through-hole in the central part thereof.

The member to be compressed for an electrochemical device of the present disclosure is a member that forms an electrochemical device and is a member that is used by being compression-deformed. The electrochemical device is not limited as long as it is a device that converts electrical energy and chemical energy, and examples thereof include a battery, such as a lithium ion secondary battery, a lithium ion capacitor, a hybrid capacitor, an electric double layer capacitor, and an aluminum electrolytic capacitor. The electrochemical device is preferably a lithium ion secondary battery or a lithium ion capacitor. Examples of the constituent member of the electrochemical device include a sealing member for an electrochemical device and an insulating member for an electrochemical device.

The member to be compressed for an electrochemical device of the present disclosure may suitably be used as, for example, a sealing member, such as a sealing gasket and a sealing packing, and an insulating member, such as an insulating gasket and an insulating packing. The sealing member is a member that is used for preventing leakage of a liquid or a gas, or invasion of a liquid or a gas from outside. The insulating member is a member that is used for insulating electricity. In some embodiments, the member to be compressed for an electrochemical device of the present disclosure is a member that is used for both purposes of sealing and insulation.

A crack is unlikely to occur even when the member to be compressed for an electrochemical device of the present disclosure is deformed at a high compression deformation rate, and further, the member to be compressed for an electrochemical device of the present disclosure exhibits a low compression set even after the member to be compressed for an electrochemical device of the present disclosure in a state of being deformed at a high compression deformation rate is used at a high temperature, and therefore the member to be compressed for an electrochemical device of the present disclosure may suitably be used in an environment where the temperature becomes high. For example, the member to be compressed for an electrochemical device of the present disclosure is suitably used in an environment where the maximum temperature reaches 40° C. or higher.

A crack is unlikely to occur even when the member to be compressed for an electrochemical device of the present disclosure is deformed at a high compression deformation rate, and further, the member to be compressed for an electrochemical device of the present disclosure exhibits a low compression set even after the member to be compressed for an electrochemical device of the present disclosure in a state of being deformed at a high compression deformation rate is used at a high temperature, and therefore the member to be compressed for an electrochemical device of the present disclosure may suitably be used as a member to be compressed for a battery. For example, when a battery, such as a secondary battery, is charged, the temperature of the battery reaches temporarily 40° C. or higher in some cases. Even when the member to be compressed for an electrochemical device of the present disclosure is used by being deformed at a high compression deformation rate in a battery, such as a secondary battery, the high rebound resilience is not impaired. Accordingly, when the member to be compressed for an electrochemical device of the present disclosure is used as a sealing member, the excellent sealing properties are retained for a long period of time. When the member to be compressed for an electrochemical device of the present disclosure is used as an insulating member, the member to be compressed for an electrochemical device of the present disclosure adheres tightly and closely to two or more electrically conductive members to prevent short circuit over a long period of time.

The member to be compressed for an electrochemical device of the present disclosure contains at least one copolymer selected from the group consisting of the copolymers (1) and (2), and therefore has excellent resistance to an electrolytic solution which is used for a non-aqueous electrolytic solution secondary battery. Accordingly, the member to be compressed for an electrochemical device of the present disclosure may suitably be used as a member to be compressed for a non-aqueous electrolytic solution secondary battery. In addition, the member to be compressed for an electrochemical device of the present disclosure is excellent in surface smoothness, a crack is unlikely to occur even when the member to be compressed for an electrochemical device of the present disclosure is deformed at a high compression deformation rate, and further, the member to be compressed for an electrochemical device of the present disclosure exhibits a low compression set even after the member to be compressed for an electrochemical device in a state of being deformed at a high compression deformation rate of the present disclosure is used at a high temperature, and therefore the member to be compressed for an electrochemical device of the present disclosure may more suitably be used as a sealing member for a non-aqueous electrolytic solution secondary battery.

The member to be compressed for an electrochemical device of the present disclosure contains at least one copolymer selected from the group consisting of the copolymers (1) and (2), and therefore has excellent insulating properties. Accordingly, the member to be compressed for an electrochemical device of the present disclosure may also suitably be used as an insulating member. In addition, the member to be compressed for an electrochemical device of the present disclosure contains at least one copolymer selected from the group consisting of the copolymers (1) and (2), and therefore the member to be compressed for an electrochemical device of the present disclosure has excellent resistance to an electrolytic solution which is used for a non-aqueous electrolytic solution secondary battery, and is excellent in surface smoothness, a crack is unlikely to occur even when the member to be compressed for an electrochemical device of the present disclosure is deformed at a high compression deformation rate, and the member to be compressed for an electrochemical device exhibits a low compression set even after the member to be compressed for an electrochemical device of the present disclosure in a state of being deformed at a high compression deformation rate is used at a high temperature, and from these reasons, the member to be compressed for an electrochemical device of the present disclosure may more suitably be used as an insulating member for a non-aqueous electrolytic solution secondary battery.

The embodiments have been described above, but it should be appreciated that various modifications on the embodiments and the details may be made without deviating from the gist and scope of the claims.

EXAMPLES

Hereinafter, the embodiments of the present disclosure will be described giving Experimental Examples, but the present disclosure is not limited to only these Experimental Examples.

EXPERIMENTAL EXAMPLES

Injection moldability and compression properties were evaluated using tetrafluoroethylene/perfluoro(propyl vinyl ether) copolymers having physical properties described in Table 1 by the following method. Respective physical properties described in Table 1 were measured by the following methods.

(Melting Point)

The melting point was determined as a temperature corresponding to a maximum value in a heat-of-fusion curve obtained when the temperature was raised at a rate of 10° C./min using a differential scanning calorimeter [DSC].

(Content of Monomer Unit)

The content of each monomer unit was measured by a $^{19}$F-NMR method. "PPVE (wt %)" described in Table 1 represents the content of perfluoro(propyl vinyl ether) unit (PPVE unit) based on all the monomer units that constitute a tetrafluoroethylene/perfluoro(propyl vinyl ether) copolymer.

(Melt Flow Rate (MFR))

The mass of a polymer that flows out per 10 minutes (g/10 min) from a nozzle having an inner diameter of 2.1 mm and a length of 8 mm under a load of 5 kg at 372° C. was determined in accordance with ASTM D1238 using a melt indexer (manufactured by YASUDA SEIKI SEISAKUSHO, LTD.).

(Fluidity in Mold)

Fluidity in a mold was evaluated according to the following criteria based on MFR measured by the above-described method.

Good: MFR was 10 g/10 min or more.
Poor: MFR was less than 10 g/10 min.

Generally, a member to be compressed for a secondary battery is small and has a thin thickness. Accordingly, to produce a large number of members to be compressed for a secondary battery at a time by an injection molding method, a mold having a complicated flow channel needs to be used. When the copolymer has a MFR of 10 g/10 min or more, a mold having a complicated flow channel may be sufficiently filled with the copolymer, and a beautiful injection-molded article can be obtained. On the other hand, when the copolymer has a MFR of less than 10 g/10 min, various defects, such as a weld line, a sink mark, a short shot, and a surface roughness called a melt fracture, are seen on a resultant injection-molded article even if injection molding was performed heating the copolymer and a mold near the decomposition temperature of the copolymer.

According to the knowledge of the present inventors, when the copolymer that is used in the present disclosure has a MFR of 10 g/10 min or more, the copolymer exhibits a good fluidity also in a spiral flow test. In the spiral flow test, the fluidity is measured by measuring the length (unit: mm) of a flowing polymer using a mold for injection mold (spiral flow mold) having a spiral groove like a mosquito coil. This test method is used when the fluidities are compared between the types and grades of polymers keeping the mold temperature and the molding condition constant, and is also used when the fluidity of a polymer is observed under a particular molding condition, such as lowering the mold temperature.

(Surface Smoothness of Molded Article)

A hollow disk-like (ring-like) molded article (outer diameter 4.6 cm, inner diameter 1.2 cm, thickness 0.3 cm) was prepared by injection-molding a pellet of a tetrafluoroethylene/perfluoro(propyl vinyl ether) copolymer using an injection molding machine at a cylinder temperature of C1/C2/C3=360/390/400 (° C.), a nozzle temperature of 400 (° C.), and a mold temperature of 200° C.

The surface roughness Ra of the molded article was determined in accordance with JIS B0601-1994 using a surface roughness measuring machine (SURFTESTS V-600 manufactured by Mitutoyo Corporation) in such a way that measurement with the number of measuring points of 5 was repeated 3 times to calculate the average value of resultant measured values. The surface smoothness was evaluated according to the following criteria based on the calculated surface roughness Ra.

Good: The molded article had a surface roughness Ra of less than 0.1 μm.
Poor: The molded article had a surface roughness Ra of 0.1 μm or more.

(Injection Moldability (Comprehensive Evaluation))

From the results of the fluidity in the mold and the surface smoothness of the molded article, the injection moldability was evaluated according to the following criteria.

Good: Both of the fluidity in the mold and the surface smoothness of the molded article were good.
Poor: At least one of the fluidity in the mold and the surface smoothness of the molded article was poor.

(Crack Resistance by 50% Compression Deformation Test and Resistance to Compression Set after High-Temperature Compression Test)

These tests and measurements were in accordance with the method described in ASTM D395 or JIS K6262.

In a state where about 20 g of a pellet of a tetrafluoroethylene/perfluoro(propyl vinyl ether) copolymer was charged in a mold (inner diameter 10 mm, height 38 mm), the copolymer was melted at 350° C. for 30 minutes with a hot plate press, and the mold was then cooled with water while the copolymer was pressurized at a pressure of 4 MPa (resin pressure), thereby preparing a molded article having a height of about 12 mm. Thereafter, a test piece having an outer diameter of 10 mm and a height of 10 mm was prepared by cutting the resultant molded article. The prepared test piece was compressed at normal temperature using a compression apparatus until the compression deformation rate becomes 50% (that is, the test piece having a height of 10 mm was compressed to a height of 5 mm). Whether a crack occurred or not in the test piece after the compression was checked to evaluate the crack resistance according to the following criteria.

Good: A crack was not ascertained.
Poor: A crack was ascertained.

Next, the compressed test piece was left to stand still in an electric furnace with the compressed test piece fixed to the compression apparatus, and was left as it was at 40° C. for 1,000 hours. The compression apparatus was taken out of the electric furnace to take out the test piece. The collected test piece was left as it was at room temperature for 30 minutes to measure the height. The compression set after the high-temperature compression test was determined according to the following formula.

Compression set(%) = $(t_0-t_2)/(t_0-t_1) \times 100$ $t_0$: Original height of test piece (mm)
$t_1$: Height of spacer (mm)
$t_2$: Height of test piece taken out of compression apparatus (mm)

In the test, $t_0$=10 mm, and $t_1$=5 mm.

The resistance to compression set after the high-temperature compression test was evaluated according to the following criteria based on the compression set after the high-temperature compression test.

Good: The compression set was 85% or less.
Poor: The compression set was more than 85%.

(Compression Properties (Comprehensive Evaluation))

From the results of the crack resistance and the resistance to compression set, the compression properties were evaluated according to the following criteria.

Good: Both of the crack resistance and the resistance to compression set were good.
Poor: At least one of the crack resistance and the resistance to compression set was poor.

Table 1 shows the results of those described above.

TABLE 1

| | Copolymer | | | Injection moldability | | | Compression properties | | |
|---|---|---|---|---|---|---|---|---|---|
| | Melting point (° C.) | PPVE (wt %) | MFR (g/10 min) | Fluidity in metal mold | Surface smoothness | Comprehensive evaluation | 50% Compression deformation test | High-temperature compression test (compression set after test) | Experimental evaluation |
| Experimental Example 1 | 295 | 7.0 | 60 | Good | Good | Good | Good | Good (85%) | Good |
| Experimental Example 2 | 299 | 6.5 | 28 | Good | Good | Good | Good | Good (83%) | Good |
| Experimental Example 3 | 305 | 4.5 | 12 | Good | Good | Good | Good | Good (81%) | Good |
| Experimental Example 4 | 294 | 8.5 | 60 | Good | Good | Good | Good | Poor (89%) | Poor |
| Experimental Example 5 | 294 | 8.5 | 2 | Poor | Not measured | Poor | Good | Poor (88%) | Poor |
| Experimental Example 6 | 308 | 3.5 | 60 | Good | Good | Good | Poor | Not measured | Poor |
| Experimental Example 7 | 305 | 4.3 | 15 | Good | Good | Good | Good | Good (82%) | Good |

The invention claimed is:

1. A sealing member to be compressed for an electrochemical device, comprising
a copolymer comprising a tetrafluoroethylene unit and a fluoroalkyl vinyl ether unit, the copolymer having a content of the fluoroalkyl vinyl ether unit based on all the monomer units of the copolymer of 4.5% by mass or more and 4.7% by mass or less, and having a melt flow rate of 10 to 23 g/10 min, wherein the copolymer has a compression set of 85% or less, the compression set being measured after the copolymer in a state of being compression-deformed at a compression deformation rate of 50% is retained at 40° C. for 1,000 hours.

2. The sealing member to be compressed for an electrochemical device according to claim 1, wherein the fluoroalkyl vinyl ether unit is at least one selected from the group consisting of perfluoro (ethyl vinyl ether) unit and perfluoro (propyl vinyl ether) unit.

3. The sealing member to be compressed for an electrochemical device according to claim 1, wherein the copolymer has a melting point of 305° C. or lower.

4. The sealing member to be compressed for an electrochemical device according to claim 1, to be used in a state of being compression-deformed at a compression deformation rate of 30% or more.

5. The sealing member to be compressed for an electrochemical device according to claim 1, to be used in an environment where the maximum temperature reaches 40° C. or higher.

6. The sealing member to be compressed for an electrochemical device according to claim 1, wherein the sealing member is an injection-molded article.

7. The sealing member to be compressed for an electrochemical device according to claim 1, wherein the sealing member is a member to be compressed for a battery.

\* \* \* \* \*